United States Patent [19]

Hanas et al.

[11] 4,336,411
[45] Jun. 22, 1982

[54] MOLTEN METAL HEATING, STIRRING AND CASTING APPARATUS

[75] Inventors: Bertil Hanas; Sven-Einar Stenkvist, both of Västeros, Sweden

[73] Assignee: ASEA Aktibolag, Västeros, Sweden

[21] Appl. No.: 237,599

[22] Filed: Feb. 24, 1981

[30] Foreign Application Priority Data

Mar. 10, 1980 [SE] Sweden .................................. 8001838

[51] Int. Cl.³ .............................................. H05B 7/00
[52] U.S. Cl. .................................... 373/85; 222/593; 373/72; 373/108
[58] Field of Search .......................... 13/9, 33, 35, 23; 222/592, 593

[56] References Cited

U.S. PATENT DOCUMENTS

| 2,348,199 | 5/1944 | Freeman | 222/592 X |
| 3,848,072 | 11/1974 | Dershem | 13/33 X |
| 3,973,076 | 8/1976 | Scott, Jr. et al. | 13/35 |
| 4,149,024 | 4/1979 | Stenkvist | 13/11 |

Primary Examiner—Roy N. Envall, Jr.
Attorney, Agent, or Firm—Kenyon & Kenyon

[57] ABSTRACT

A molten steel ladle has a melt electrode in its side wall near its bottom so a DC arc can be formed with molten metal in the ladle for heating and stirring the metal, the ladle being also used for casting. The melt electrode is free from the ladle's casting nozzle and the outside of the ladle is free from projections extending beyond the ladle's trunions, so the ladle can be crane-carried in the usual manner.

5 Claims, 3 Drawing Figures

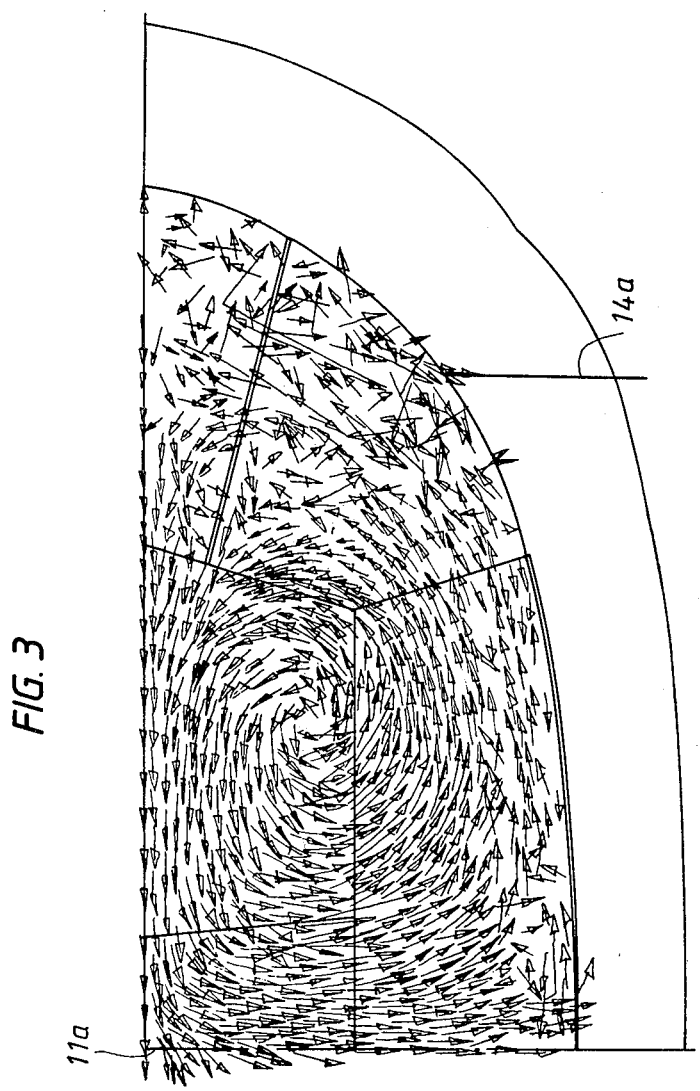

MOLTEN METAL HEATING, STIRRING AND CASTING APPARATUS

BACKGROUND OF THE INVENTION

It is prior art to pour steel from its steel-making furnace into a ladle having trunions projecting from the top portion of its side wall for engagement by the hooks of a crane. The ladle has a nozzle in its bottom wall normally closed by either a stopper rod, slide valve or by some other kind of valve. The ladle is carried by the crane to the casting location where the valve is opened for casting of the steel.

Between receiving the moltel steel and its casting, it is also prior art to position the ladle in an induction stirring apparatus where the steel is heated and stirred for final working prior to casting. For this the metal plate from which the ladle side and bottom walls is formed must be non-magnetic, non-magnetic stainless steel being a usual material. Otherwise the ladle can be made as usual with nothing projecting from its side wall other than the trunions.

This induction stirring practice involves the use of equipment that is expensive to make and operate.

The object of the present invention is to provide an apparatus providing for heating and stirring of the molten steel in the ladle at less expensive than the induction heating practice, and for ultimate casting of the finished steel.

SUMMARY OF THE INVENTION

According to this invention, what may otherwise be a conventional steel ladle has an electrically conductive ring built into its side wall adjacent to its bottom wall and offset from the nozzle in the bottom wall. As with all such ladles, its side and bottom walls are lined with refractory brick or other refractory, but with this invention the brick or other refractory in front of or registering with the ring is made electrically conductive. Nothing need project from the outside of the usual ladel wall and the latter can be made of ordinary magnetic steel plate, although possibly projections may extend outwardly through the plate in the form of electric connectors providing these are kept within the radial limits imposed by the ladel trunions in all cases. Any usual valve nozzle may be provided.

The above makes it possible to conduct DC uniformly into the molten steel in the ladle while an arcing electrode is positioned above the steel so as to form an arc with the steel when connected with a DC power source which also powers the electrically conductive ring with its facing of electrically conductive refractory.

In the above way DC arc heating of the steel in the ladle is made possible, with its inherent less expense. The DC passing through the molten steel causes stirring for distributing additions while the arc heats the steel during its working in the ladle.

At the same time the ladle, free from anything that projects beyond its trunions can be carried by the crane from the steel-making furnace to a location beneath the arcing electrode which can be manipulated in the same way it is in the case of a DC electric arc steel-making furnace, and after final processing from there the ladle can be carried by the crane to the casting location where the ladel nozzle can be opened for casting in the usual way.

DESCRIPTION OF THE DRAWINGS

The principles of the invention are schematically illustrated by the accompanying drawings in which:

FIG. 3 is a horizontal cross section taken through a portion of the hearth of a conventional DC electric arc steel making furnace and by force vectors showing the stirring action which occurs when DC is carried through molten steel.

DETAILED DESCRIPTION OF THE INVENTION

Figure 1:
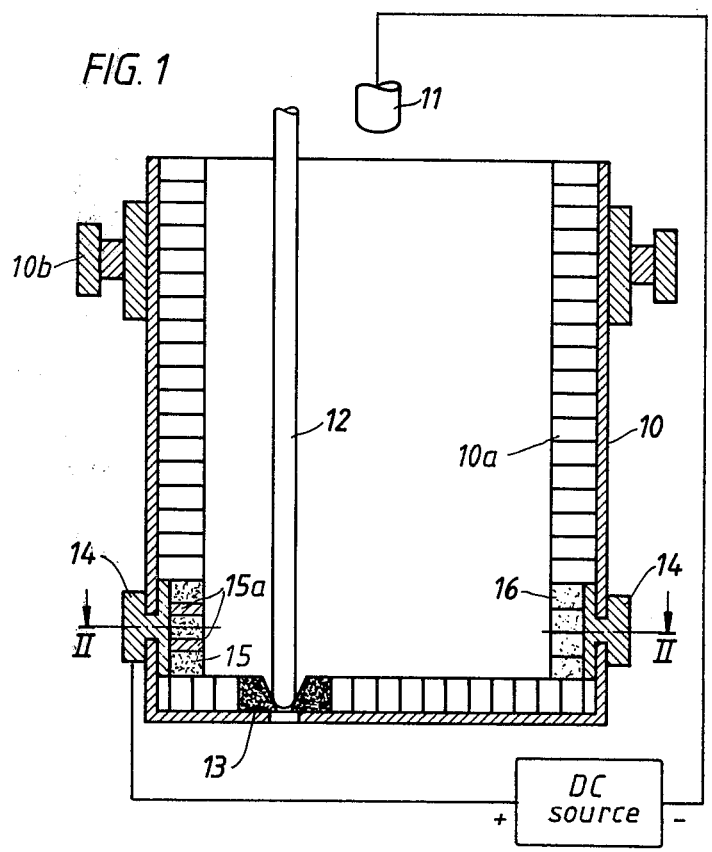
FIG. 1 is a vertical section showing the ladle.

In FIG. 1 the ladel is shown formed by a conventional steel plate shell 10 with its side and bottom walls lined with refractory bricks 10a throughout. The usual magnetic steel plate may be used contrasting with the more expensive non-magnetic metals. For carrying by crane, the usual trunions 10b are shown diametrically extending from the outside of the steel shell 10, for the normal distance required for engagement by the crane hooks. A stopper rod 12 provides the usual valving action for the ladle nozzle 13 formed in the bottom wall of the ladle in the usual way. Other conventional valve arrangements could be used instead, such as a slide valve.

The electrically conductive ring 14 is shown as practically completely encircling the periphery of the ladle side wall adjacent to its bottom wall. This ring is made in four segments providing substantially complete peripheral continuity, it can be made of copper for high conductivity, and it can have parts which project outwardly through the ladle's side wall far enough for connection with a DC power source. However, the projecting distance should not be greater than that of the trunions 10b, and can be less than is illustrated. Internally the ring 14 forms a cylindrical surface that does not project inwardly very far from the metal plate 10 of the ladle shell and in front of this, on the left-hand side in FIGS. 1 and 2 the usual refractory bricks 10a are replaced by a rammed refractory 15 having an inner surface flush with that of the bricks 10a. For conductivity in this case a multiplicity of steel rods 15a are contacting the inside surface of the ring 14 so as to extend through the rammed refractory, these rods having inner ends contacted by the molten steel when in the ladle.

Figure 2:
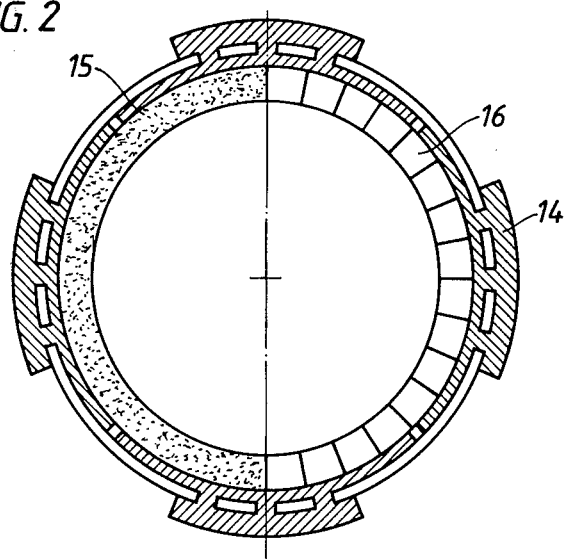
FIG. 2 is a cross section taken on the line II—II in FIG. 1.

On the right-hand side of FIGS. 1 and 2 electrically conductive refractory bricks 16 are used instead of the rammed compound 15. Either form of construction can be used. The conductive refractory should be such as to protect the metal ring 14 against melting.

There is adequate space for this refractory because the ring 14 need not be made of great thickness to carry substantial electric current, because the ring extends around the entire periphery of the ladle excepting for small interruptions required for thermal movements.

With this apparatus the ladle 10 can be carried by its trunions 10b via a crane to the steel-making furnace where the ladle is filled with molten steel in the usual manner and in the usual manner the ladle can be carried to beneath an electric arcing electrode 11. At this location the ring 14, which functions as a melt electrode, can be electrically connected to a DC power source which is also connected to the electrode 11 so as to provide for the formation of an arc with the steel in the ladle. After further processing, the ladle can be carried to the casting location where the stopper rod 12 is lifted for casting via the nozzle 13. When another valve is used, it is opened at this time.

Note that not only is a melt electrode provided uniformly around the periphery of the ladle side wall and entirely free and offset from the nozzle 13, but that also this is done without any protuberances, projections or the like extending radially from the furnace shell. The connections for the ring 14 need not extend as far as the trunions 10b which must be provided in any event. Nothing interferes with carrying of the ladle in the usual fashion.

In FIG. 4 a quarter portion of the hearth of a DC arc steel-making furnace is shown in cross section where the melt electrode is extending from the furnace center to about the position shown at 14a and the foot of the electric arc is shown at 11a. Usually for DC arc heating the melt electrode is made the anode and the arcing electrode is made the cathode. Therefore, the arcing power current travels to the point shown at 11a in FIG. 3 through the melt for the anodic metal electrode 14a. The resulting stirring is indicated by the arrows representing the vectors of the forces provided. In this case the field was obtained after four iterations, 1 cm 0.1 m/s, max. speed 0.7 m/s. Parallel current paths tend to attract each other and the force vectors shown in FIG. 3 result.

Consequently, this same stirring action is obtained in the ladle 10 when the arcing electrode 11 is operating and in this case the current runs to the foot of the arc formed from the cathodic electrode 11, centrally positioned relative to the ladle, through the molten steel while spreading uniformly to the peripherally continuous electrically conductive refractory previously described and to the electrically conductive metal ring 14. All of the heating and stirring advantages of DC arc furnace operation are obtained by a ladle having the compactness and general external appearance of a conventional steel ladle.

Incidentally, it should be mentioned that none of the known melt electrode arrangements used for DC electric arc steel-making furnaces can be incorporated into a ladle construction, because a ladle must be carried about at the steel plant.

The four ring segments forming the ring 14 should each be connected in parallel to the DC source, FIG. 1 being only a schematic representation. The arcing electrode can be manipulated by the usual positioning equipment used in the case of a DC steel-making arc furnace where the arcing electrode must be raised and lowered for furnace roof removal during charging, etc.

What is claimed is:

1. A metal heating, stirring and casting apparatus comprising a ladle having bottom and side walls and refractory lining covering the insides of said walls for containing the molten metal, a valved casting nozzle in said bottom wall, an electric contact in said side wall at a position offset from said nozzle and adjacent to said bottom wall so as to be contacted by the molten metal when in said ladle, an arcing electrode positioned above said ladle so as to form an arc with the molten metal when in the ladle, and means for connecting said contact and electrode with DC for powering said arc.

2. The apparatus of claim 1 in which said contact is formed by an electrically conductive metal ring extending substantially completely around the periphery of said side wall and the portion of the side wall's said refractory lining on the inside of said ring is electrically conductive.

3. The apparatus of claim 2 in which said portion of the refractory lining is formed by electrically conductive refractory bricks.

4. The apparatus of claim 2 in which said portion of the refractory lining is formed by refractory compound rammed on the inside of the ring and electrically conductive metal elements electrically connected to said ring and extending through said compound and with portions exposed on the inside of said compound so as to be contacted by said molten metal.

5. The apparatus of claim 2 in which said portion of the refractory lining is formed by refractory bricks on the inside of the ring and electrically conductive metal elements electrically connected to said ring and extending through said bricks and with portions exposed on the inside of said compound so as to be contacted by said molten metal.

* * * * *